OR 3,698,794

T 3073

United States Patent

Alphonse

[15] 3,698,794

[45] Oct. 17, 1972

[54] SONIC PAGE COMPOSER FOR HOLOGRAPHIC MEMORY

[72] Inventor: Gerard Argant Alphonse, Princeton, N.J.

[73] Assignee: RCA Corporation

[22] Filed: Dec. 2, 1970

[21] Appl. No.: 94,245

[52] U.S. Cl. ....................350/161, 350/3.5, 340/173

[51] Int. Cl. ....................G02f 1/32

[58] Field of Search.....350/161, 3.5; 340/173 L, 173 LM; 307/311, 210

[56] References Cited

UNITED STATES PATENTS

| | | | |
|---|---|---|---|
| 2,557,974 | 6/1951 | Kibler | 350/161 X |
| 3,297,876 | 1/1967 | DeMaria | 350/161 X |
| 3,431,504 | 3/1969 | Adler | 350/161 X |
| 3,502,879 | 3/1970 | Vallese | 350/161 X |
| 3,507,553 | 4/1970 | Anderson et al. | 350/161 |
| 3,530,442 | 9/1970 | Collier | 350/3.5 X |

OTHER PUBLICATIONS

Soroko: " Holography and Interference Processing of Information," Soviet Physics Ugpekhi, vol. 90, pp. 643, 666- 668, March- April, 1967

Rajchman: " Promise of Optical Memories," Jour. of Applied Physics, vol. 41, pp. 1,376- 1,383, March, 1970

*Primary Examiner*—David Schonberg
*Assistant Examiner*—Edward S. Bauer
*Attorney*—H. Christoffersen

[57] ABSTRACT

A page composer is disclosed for translating a plurality of serial electrical binary information signals to a pattern of light on an opto-magnetic recording medium. A plurality of radio-frequency oscillators each has a control input coupled to a source of serial binary information signals, and an output coupled to an electro-mechanical transducer at one end of a respective one of a plurality of acousto-optic columns. Sonic information is thus propagated serially through the columns as information cells which contain a sonic burst to represent one binary value, and no burst to represent the other binary value. Incident light from a source is directed through the columns at an angle with the sonic wavefronts therein to cause diffraction of the light. The source of light is pulsed when the columns are filled with serially-supplied sonic information. Cells containing a sonic burst cause a diffraction of the light passing therethrough, and cells not containing a sonic burst permit the light to pass directly therethrough.

4 Claims, 4 Drawing Figures

PATENTED OCT 17 1972

3,698,794

SHEET 1 OF 2

INVENTOR
GERARD A. ALPHONSE

BY
Carl V. Olson
ATTORNEY

INVENTOR.
GERARD A. ALPHONSE
BY Carl V. Olson
ATTORNEY

SONIC PAGE COMPOSER FOR HOLOGRAPHIC MEMORY

BACKGROUND OF THE INVENTION

A computer memory system has been proposed which includes a page array of electrically responsive light valves. A laser light source, a light deflector and holographic optics are provided to create a hologram of the array of light valves at any one of many small areas on an erasable holographic storage medium. Subsequently, the hologram can be illuminated to recreate and project the image of the array of light valves onto an array of photosensors to translate the information back into electrical form for use by a computer. The page arrays of light valves and photosensors serve as a page-at-a-time electrical input-output means for a great many pages of information stored optically on the erasable holographic storage medium.

SUMMARY OF THE INVENTION

According to an example of the invention, a page composer array of light valves is constructed to translate a plurality of serial electrical binary information signals to a patter of light. The plurality of serial electrical binary signals each control the propagation of sonic bursts through one of a plurality of acousto-optic columns. A sonic burst represents binary information of one value, and the absence of a burst represents binary information of the other value. When the columns are filled with serially-supplied sonic information, light is directed through the columns. Light passing through a sonic burst is diffracted and scattered, while the remaining light passes directly through the columns to a utilization device.

DESCRIPTION OF THE PREFERRED EMBODIMENT

Figures 1, 2:
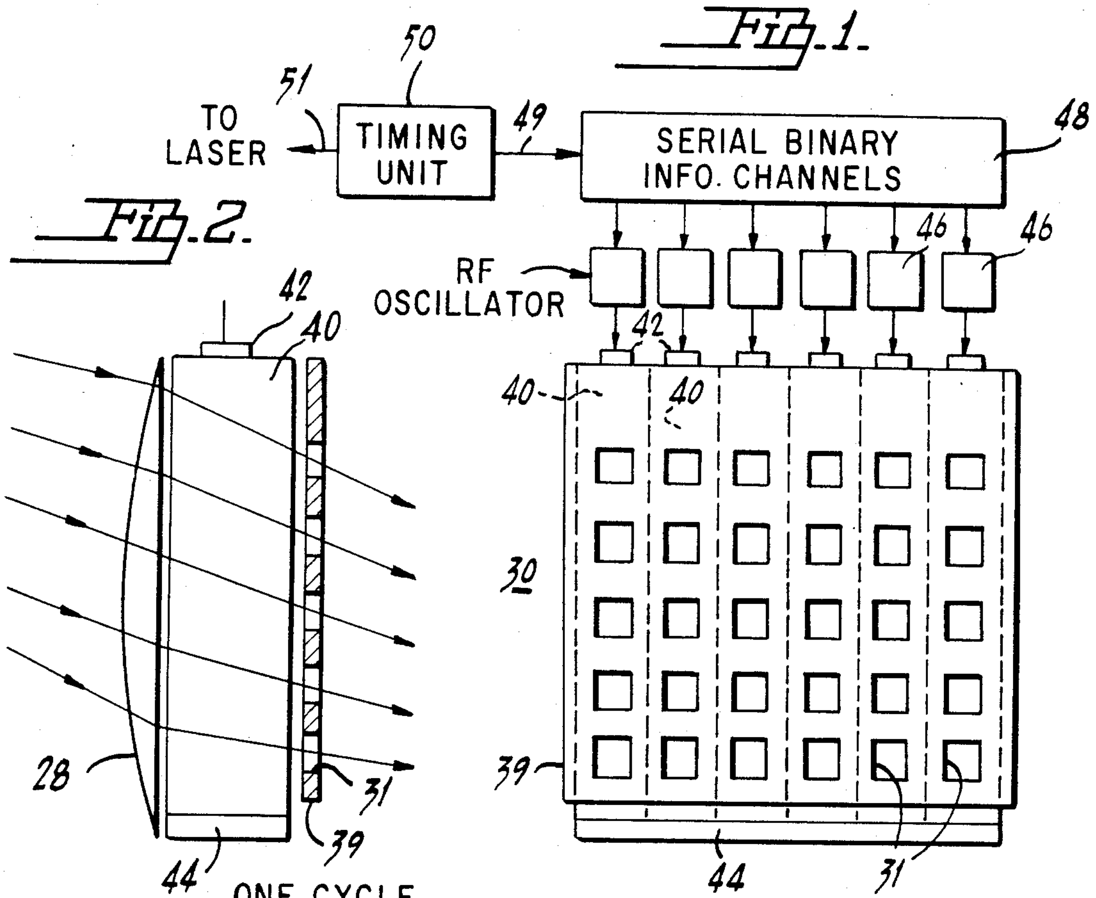
FIG. 1 is a diagram of a page composer for translating electrical binary information signals to a pattern of output light.
FIG. 2 is a side view of a portion of the page composer shown in FIG. 1.

Referring now in greater detail to FIGS. 1 and 2, there is shown a page composer 30 including a plurality of columns 40 of an acousto-optic, photoelastic material which is transparent to the incident light employed and is an effective medium for the transmission of sonic stress waves. Each column 40 is provided at one end with an electro-mechanical transducer 42, and is provided at the opposite end with an acoustic termination 44. The columns 40 of photoelastic material may be constructed of water, glass, quartz, or lead molybdate, for example. The elector- mechanical transducers may for example be made of lithium niobate or cadmium sulfide.

Figure 3:
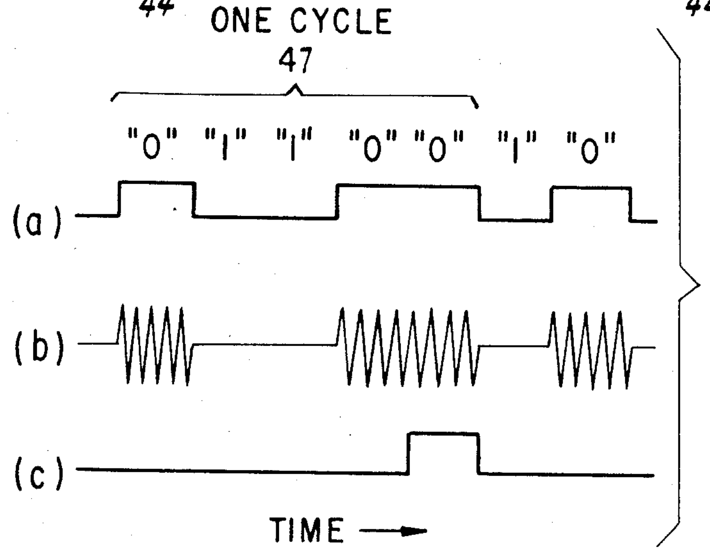
FIG. 3 is a chart of electrical signals which will be referred to in describing the operation of the page composer of FIGS. 1 and 2.

A plurality of electrical radio-frequency oscillators 46 each has an electrical output connected to a respective one of the transducers 42 on a respective acousto-optic column 40. Each oscillator 46 is controlled from a source 48 of a plurality of serial binary information signals. Each serial binary information signal supplied from source 48 to control one of the oscillators 46 may be as shown in FIG. 3*a*, wherein each successive information cell is represented as containing a binary "1" or a "0". The control signal of FIGS. 3*a* causes the respective oscillator 46 to pass bursts of radio-frequency energy, as shown in FIG. 3*b*, to the respective transducer 42 when the control signal has a level arbitrarily shown in FIG. 3*a* as representing a binary "0". The radio-frequency electrical bursts serially supplied to a respective transducer 42 cause bursts of sonic energy to be propagated downwardly through the respective column 40 of acousto-optic material.

In the example illustrated, there are five time-space positions representing five binary information bits which can be present as sonic conditions at any given instant in each sonic column 40. When all six of the sonic columns are each filled with five sonic information cells, each of which includes either a burst or an absence of a burst, the thirty information bits present can be read out by shining light through the columns. A timing unit 50 acts over line 49 to control the timing of the "1" and "0" information cells of the control signals supplied from source 48. The timing unit 50 also has an output 51 which produces a pulse as shown in FIG. 3*c* at the end of every cycle 47 when the columns are loaded with five sonic information cells.

One side of the plurality of columns 40 of electro-optic material is provided with a lens 28 (FIG. 2), and the other side is provided with an optical mask 39 having apertures 31 positioned along each column with a spacing equal to the spacing between successive sonic information cells propagated through the columns. The positions of the lens 28 and mask 39 may be reversed, or both may be on one side of the columns 40. The apertures in the mask 39 define a page array of columns and rows of binary information bits represented by the sonic conditions in the columns 40. The page of binary information is transferred to a utilization device by a pulse of light applied to the page array 30 under control of the timing unit 50.

While the page composer is illustrated as having five memory cells in each of six columns, it may for example be constructed to have 100 cells in each of 100 columns with each aperture 31 being 5 milli-inches in size and spaced apart 10 milli-inches from center to center. If the electromechanical transducer is lithium niobate operating at 100 MHz and the acousto-optic medium is lead molybdate through which sound propagates at 3.75 km/sec, the acousto-optic columns may have a length of about 1 inch or 25 mm., a distance through which sound travels in 6.6 microseconds. A sonic burst takes 0.033 microseconds to pass an aperture 31 in mask 39, and this limits the duration of the laser light pulse used in reading out the sonic information from the page composer. If more time is needed, the physical lengths of the cells and the durations of the sonic bursts may be appropriately increased.

Figure 4:
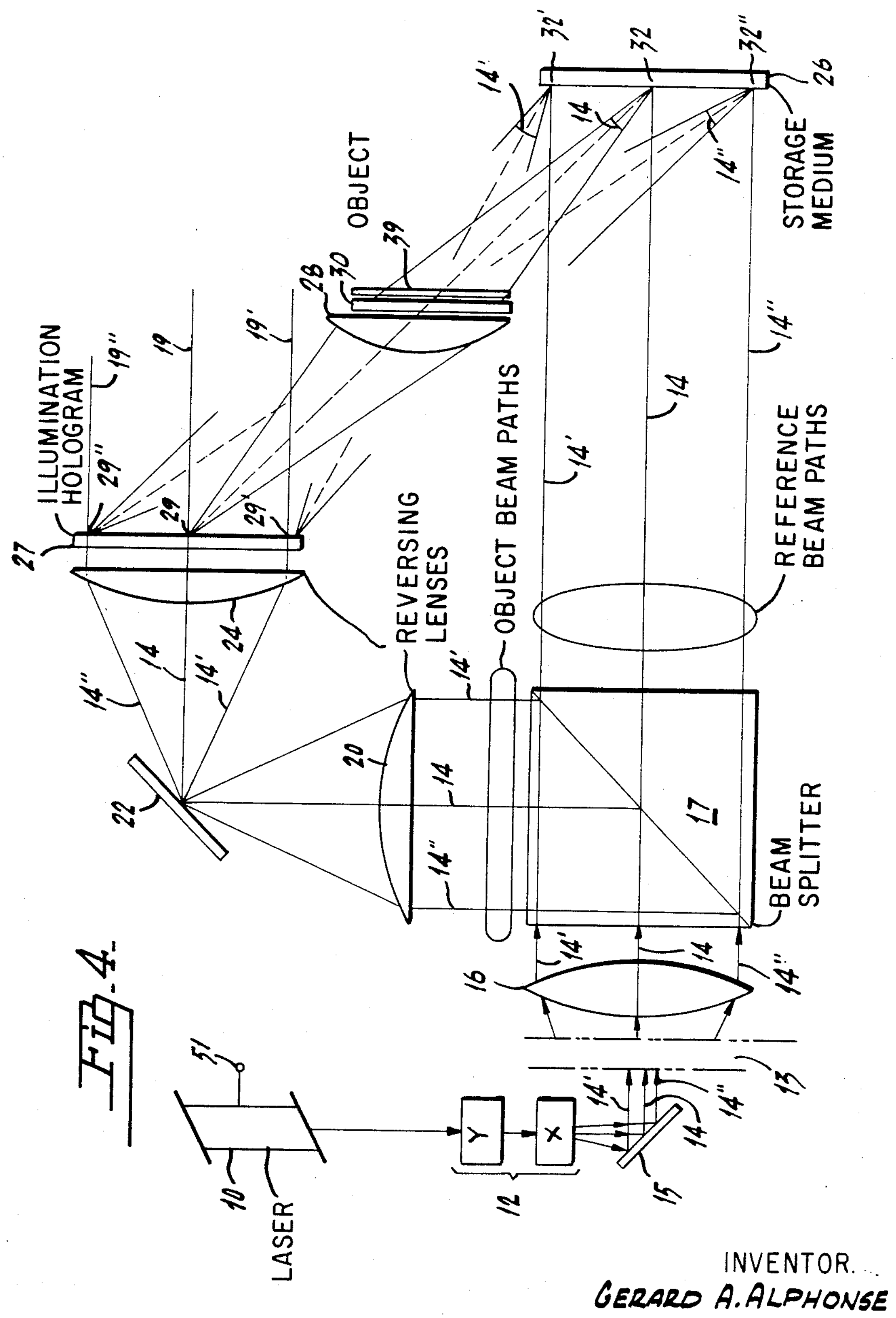
FIG. 4 is a diagram of a holographic memory system incorporating the page composer in FIGS. 1 and 2.

Reference is now made to FIG. 4 for a description of a holographic memory system including the page composer shown in FIGS. 1 and 2. The memory system shown includes a laser 10 and a beam deflector 12 including *x*-direction deflector X and *y*-direction deflector Y. The laser 10 may be a conventional pulsed solid state laser operating in a single transverse mode to produce a polarized and well-collimated beam. The deflected light beam from the laser 10 may be along any one of the paths 14, 14′ and 14″, or any intermediate path. The deflected beam, after being reflected by a path-folding mirror 15, is directed through a collimating lens 16 from which the angularly-deflected beams emerge in parallel relation to the optical path 14 of an undeflected beam.

A light beam emerging from the collimating lens 16 is directed to a beam splitter 17 which transmits a portion of the incident light beam along a reference beam path, and reflects the remaining portion of the incident light beam along an object beam path. The object beam path includes, in the order named, a lens 20, a plane mirror 22, a lens 24, an illumination hologram 27, a lens 28, and a page composer 30 with a mask 39 as shown in FIGS. 1 and 2.

The mirror 22 is necessary to redirect the beam back toward the illumination hologram 27 and thence to the storage medium 26. The lenses 20 and 24 may have the same focal lengths F and be spaced apart a distance equal to 2F. The lenses 20 and 24 are inverting or reversing lenses employed to cancel the image reversals caused by lens 28. The construction shown insures that the light beam 14′, for example, reflected from the beam splitter 17 will follow a path 14′ to the same spot 32′ on the storage medium 26 as the beam 14′ transmitted directly through the beam splitter 17 to the storage medium 26. It should be remembered that at any given time the light beam follows a single one of the three illustrated paths, or a single intermediate path. In addition, since the beam is deflected in both the $x$ and $y$ directions, the beam may follow a path which is below the plane of the paper, or above the plane of the paper, on which FIG. 1 is drawn.

The portion of the light beam following the object beam path is directed to one illumination hologram in an array 27 of illumination holograms. Each illumination hologram is constructed to diverge or spread out a received narrow beam to illuminate a page array 30 of binary memory units. The portion of the light of object beams 14″, 14 and 14′ which is undiffracted by the illumination hologram 27 leaves the system by passing directly along paths 19″, 19 and 19′ to a stray light absorber (not shown). A page lens 28 is inserted near the page array 30 to converge or concentrate the diffracted and spread-out light to a small area on the holographic storage medium 26. For example, as shown in FIGS. 1 and 2, the central beam 14 impinging on a central illumination hologram 29 in the array 27 of illumination holograms is spread out within a conical or pyramidal solid volume to the page lens 28 and page array 30 of memory units, from which the light is concentrated through a solid conical or pyramidal volume so that the light reaches a small area 32 on the holographic storage medium 26. Similarly, when the deflected light beam 14″ impinges on a hologram in the array 27, the beam is spread out within a conical or pyramidal volume to the page lens 28 and page array 30, from which the light is converged to a small area 32″ on the holographic storage medium 26. In like fashion, the light beam 14′ illuminates the page array 30 and converges on the small area 32′ on the storage medium 26. The distance between the illumination hologram 27 and the holographic storage medium 26 is preferably 4 times the focal length of the centrally-located lens 28 for one-to-one imaging.

The array 27 of illumination holograms consists of a number of individual phase holograms, one of which at a time is illuminated by an incident light beam. When the incident light beam is undeflected and follows the path 14, the hologram 29 is illuminated, and the light emerging from the hologram 29 illuminates the entire area of the page array 30 of binary memory units. Actually, the illumination hologram 29 is constructed so that, in use, the illumination hologram 29 illuminates solely the apertures in the mask 39 and does not waste light on spaces between the apertures. When the beam directed to the array of holograms 27 is deflected so that it illuminates a different individual hologram 29″, the page array 30 of individual memory units is similarly illuminated. Light passing through apertures in the page composer 30 is condensed to a small area 32 on the holographic storage medium 26. A hologram of the page array of light valves is created in the area 32 by the combined effect of the condensed object beam and the reference light beam.

The erasable holographic storage medium 26 may be constructed of a two-millionths of an inch thick layer of manganese bismuth deposited on an oriented substrate such as mica or sapphire, or on an amorphous substrate such as glass. The assembly is initially heated to form the manganese bismuth film into a single crystal and is later subjected to a strong magnetic field that forces all its magnetic atoms to line up with their north poles in one direction normal to the surface of the film. The direction of magnetization at elemental areas on the film can be changed where optical energy from a laser impinges and generates heat. This is called Curie point writing or recording. The optical pattern thus recorded in the magnetic condition of the film as a phase hologram, can be read out by a reference beam directed to the film to cause a recreation of the optical image at a utilization plane including an array of photodiodes (not shown).

OPERATION

In the operation of the described memory system, electrical binary information signals from source 48 control radio-frequency oscillators 46 which energize electro-mechanical transducers 42 to propagate sonic information signals in succession through the columns 40. When the page array is filled with sonic information, the timing unit 50 supplies a signal over line 51 to the laser 10 to cause a pulse of light therefrom.

The particular small area selected for the storage of the page of information is determined by the amount of $x$ and $y$ deflection given to the light beam from the laser 10. If the central area 32 of the holographic storage medium 26 is to receive the holographic image of the page array, the deflector 12 is made to cause the laser beam to follow the paths labeled 14. The laser beam passes directly through the beam splitter 17 as a reference beam to the area 32 on the recording medium 26. The portion of the light beam reflected by the beam splitter 17 passes through lens 20, mirror 22, lens 24 and impinges on an illumination hologram in the array 27 of illumination holograms. The beam is thereby caused to fan out within a conical (or pyramidal shaped) volume which illuminates the page composer 30.

The light entering the page array 30 of columns 40 is diffracted where it encounters a sonic burst representing a "0" information bit, and passes straight through and out an aperture 31 where the absence of a sonic burst represents a "1" information bit. The pattern of light spots constituted by the undiffracted light is projected onto the small area 32 on the holographic storage medium 26. The interfering action of the page array object beam from page array 30 and the reference beam produces a page hologram at the small area 32 on the medium 26. The thus-recorded page hologram remains on the manganese bismuth storage medium until it is intentionally erased.

The page array hologram which has been described as being formed at the small area 32 on the holographic medium 26 by light originating at 29 on the illumination hologram 27. The image could have been recorded at any other selected position on the medium 26 by appropriately controlling the *x* and *y* deflection imparted to the laser beam by the deflector 12. For example, light originating at 29' would make an image at 32'. The system is thus one in which light is directed to the page array 30 at any one of a number of different angles. Also, the light originating at a given point, such as 29, is spread out to illuminate the entire page composer 30, and as a consequence, the light impinges at different angles on different parts of the page array.

Normally, a sonic deflector such as those shown in FIGS. 1 and 2 requires the incident light to be at angles very close to the Bragg angle for efficient operation. However, the range of incident angles providing effective diffraction can be increased by employing a sonic diffraction grating between the electro-mechanical transducer and the acousto-optic medium. Therefore, the sonic light deflectors in page composer 30 should preferably be constructed in accordance with the teachings of a concurrently-filed patent application Ser. No. 94,244 filed on Dec. 2, 1970, by Gerard A. Alphonse and Wilbur C. Stewart entitled "Acoustic Light Deflector With Increased Angular Range", and having the same assignee as the present application.

What is claimed is:

1. The combination of
   a plurality of parallel-extending acousto-optic columns each having an electro-mechanical transducer at one end,
   a plurality of radio-frequency oscillators each having a control input coupled to a source of serial binary information signals and an output coupled to a respective transducer, whereby to propagate binary information serially through all of said columns in unison as sonic information cells which contain a sonic burst to represent one binary value and no burst to represent the other binary value, and
   means periodically operative whenever said columns are newly filled with serially-supplied sonic information cells to direct light from a source through said columns at an angle with the sonic wavefronts therein to cause diffraction of the light passing through a sonic burst.
2. The combination as defined in claim 1 and, in addition, a mask having apertures spaced an amount equal to the spacing between successive sonic information cells.
3. The combination as defined in claim 1 and, in addition, a mask having apertures spaced an amount equal to the spacing between successive sonic information cells, and means to pulse said source of light when serial information cells are in registry with the apertures of said mask.
4. Means for translating a plurality of serial electrical binary information signals to a pattern of light on an opto-magnetic recording medium, comprising
   a plurality of parallel-extending acousto-optic columns each having an electro-mechanical transducer at one end, and an acoustic termination at the other end,
   a plurality of radio-frequency oscillators each having a control input coupled to a source of serial binary information signals and an output coupled to a respective transducer, whereby to propagate binary information serially through all of said columns in unison as sonic information cells which contain a sonic burst to represent one binary value and no burst to represent the other binary value,
   a source of an incident light directed through said columns at an angle with the sonic wavefronts therein to cause diffraction of the light passing through a sonic burst,
   a mask having apertures spaced an amount equal to the spacing between successive sonic information cells, and
   means to pulse said source of light whenever said columns are newly filled with serially-supplied sonic information cells and the information cells are in registry with the apertures of said mask, whereby cells containing a sonic burst cause a diffraction of the light passing therethrough, and cells not containing a sonic burst permit the light to pass directly therethrough.

* * * * *